United States Patent
Kübel et al.

(10) Patent No.: US 7,356,896 B2
(45) Date of Patent: Apr. 15, 2008

(54) MOUNTING DEVICE FOR A CABLE CUP

(75) Inventors: Johann Kübel, Kasten (AT); Helmut Kadrnoska, Vienna (AT); Gerhard Reiss, Laxenburg (AT)

(73) Assignee: Wien Kanal-Abwassertechnologien GesmbH, Vienna (AT)

( * ) Notice: Subject to any disclaimer, the term of this patent is extended or adjusted under 35 U.S.C. 154(b) by 639 days.

(21) Appl. No.: 11/010,052

(22) Filed: Dec. 10, 2004

(65) Prior Publication Data

US 2005/0116121 A1    Jun. 2, 2005

Related U.S. Application Data

(63) Continuation of application No. PCT/AT03/00134, filed on May 9, 2003.

(30) Foreign Application Priority Data

Jun. 10, 2002    (AT)    ............... GM369/2002

(51) Int. Cl.
  *B23P 23/00*    (2006.01)
  *H02G 1/00*    (2006.01)
  *H02G 9/06*    (2006.01)

(52) U.S. Cl. ............... 29/33 T; 29/26 B; 29/33 K; 29/564.1; 29/565; 408/237; 408/77; 405/183.5; 405/184.4

(58) Field of Classification Search ............... 29/33 T, 29/26 A, 26 B, 564, 564.1, 565, 50, 54, 55, 29/33 K; 409/143; 408/77, 236, 237; 405/154.1, 405/183.5, 184.4

See application file for complete search history.

(56) References Cited

U.S. PATENT DOCUMENTS

| | | | | |
|---|---|---|---|---|
| 4,647,251 A | * | 3/1987 | Gale | 405/184.4 |
| 4,822,211 A | * | 4/1989 | Shinoda et al. | 405/183.5 |
| 6,439,809 B1 | * | 8/2002 | Hecht et al. | 405/184.4 |
| 6,644,892 B2 | * | 11/2003 | Nishiwaki et al. | 405/184.4 |
| 6,832,873 B1 | * | 12/2004 | Kadrnoska et al. | 405/183.5 |
| 7,249,918 B1 | * | 7/2007 | Bowman | 409/132 |

FOREIGN PATENT DOCUMENTS

| | | |
|---|---|---|
| DE | 1 168 375 | 4/1964 |
| DE | 2 040 856 | 2/1972 |

(Continued)

*Primary Examiner*—Erica Cadugan
(74) *Attorney, Agent, or Firm*—Laurence A. Greenberg; Werner H. Stemer; Ralph E. Locher

(57) ABSTRACT

A cable cup can be mounted in an optimal location on the wall of an otherwise inaccessible duct, so that, above all, inlets into the duct are not obstructed. A mounting device has a carriage that is movable in the longitudinal direction of the duct. A supporting unit for the cable cup is mounted on the carriage. A carrier is pivotally connected to the carriage via a longitudinal shaft. A directing unit supports the cable cup and is movable toward the wall of the duct. A drilling device and a screwdriver device are longitudinally movable on the shaft. By pivoting the support and thus the directing unit, the cable cup is fixed in the desired position on the wall, a hole is drilled through the cable cup and into the wall of the duct and a screw is screwed into the hole by the screwdriver device.

16 Claims, 4 Drawing Sheets

FOREIGN PATENT DOCUMENTS

| | | |
|---|---|---|
| DE | 31 22 393 A1 | 12/1982 |
| GB | 2 040 856 A | 9/1980 |
| JP | 08-103012 A * | 4/1996 |
| JP | 09 100 991 A | 4/1997 |
| JP | 2000-261924 A * | 9/2000 |
| WO | 02/22974 A1 | 3/2002 |

* cited by examiner

MOUNTING DEVICE FOR A CABLE CUP

CROSS-REFERENCE TO RELATED APPLICATION

This is a continuing application, under 35 U.S.C. § 120, of copending international application No. PCT/AT03/00134, filed May 9, 2003, which designated the United States; this application also claims the priority, under 35 U.S.C. § 119, of Austrian patent application No. GM 369/2002, filed Jun. 10, 2002; the prior applications are herewith incorporated by reference in their entirety.

BACKGROUND OF THE INVENTION

Field of the Invention

The present invention relates to a mounting device for a cable cup for lines, in particular for fiber-optic cables installed in a duct, such as a sewer. The mounting device comprises a carriage that is movable in the longitudinal direction of the duct, on which there is a supporting unit for the cable cup that can be moved toward the wall of the duct, as well as a mounting device for securing the cable cup to the wall of the duct.

It is known that lines, in particular fiber-optic cables, can be installed in sewers, so that the excavation that is needed to lay such lines can be avoided, at least to some extent. When this is done, the lines are accommodated in cable cups that are secured to the wall of the duct.

Our earlier, commonly assigned patent application No. 10/382,605, now U.S. Pat. No. 6,832,873, and Austrian patent application 1521/2000 describe an installation carriage in which a movable supporting framework is fitted at both ends with cantilever supports on which there are seats for operators and from which a mounting unit-installed on a platform that can be raised or lowered-is controlled. Such an installation carriage can only be used in ducts that are accessible. Very frequently, however, lines have to be installed in sewer pipes that are of a diameter that renders them inaccessible, so that it is not possible for operating personnel to work in the duct; rather, the installation units that are mounted on the installation carriage must be remotely controlled from the surface and the course followed by the cable cups that are to be secured to the wall of the duct cannot be influenced. In order to prevent solids that are carried along if greater quantities of water pass through the duct from getting caught up on the cable cups and thereby reducing the effective cross section of the duct, it is expedient to arrange the cable cups at or close to the crown or top of the duct. On the other hand, the cable cups may not be disposed in the area of inlets into the duct, for that the flow cross section at the inlet will be reduced and solid waste will be trapped.

SUMMARY OF THE INVENTION

It is accordingly an object of the invention to provide a mounting device for a cable cup which overcomes the above-mentioned disadvantages of the heretofore-known devices and methods of this general type and which makes it possible to change the course of the cable cup within the duct and adapt it to particular requirements.

With the foregoing and other objects in view there is provided, in accordance with the invention, a mounting device for a cable cup for lines in a duct, comprising:

a carriage movably disposed along a longitudinal direction of the duct;

a supporting unit for the cable cup movably disposed on said carriage for movement toward a wall of the duct;

a support pivotally connected to said carriage about a shaft extending in the longitudinal direction of the duct; and a mounting unit for securing the cable cup to the wall of the duct disposed on said support.

In a preferred embodiment of the invention, the mounting device is configured for laying fiber-optic cables in sewer ducts.

In other words, the objects of the invention are achieved by improving on the mounting device that has a carriage which is movable in the longitudinal direction of the duct and on which there is a supporting unit for the cable cup that is movable in the longitudinal direction of the duct as well as a mounting device for securing the cable cup to the wall of the duct. The present invention proposes that the mounting unit be disposed on a support that is connected to the carriage so as to be able to pivot about a shaft that extends in the longitudinal direction of the duct. Because of the pivotability of the support, such a configuration makes it possible to change the position of the mounting unit relative to the wall of the duct and thereby adapt the course of the cable cup that is to be secured to the wall of the duct to particular requirements, for example, so as to avoid inlets into the duct. Naturally, one prerequisite for this is that the cable cup be so configured that it is possible to change its course in the duct. Cable cups of this kind have been described in a commonly assigned earlier application.

According to one preferred embodiment of the present invention, the mounting unit comprises a directing unit that is disposed on the support, surrounds the cable cup, at least in part, and is movable in the direction of the duct wall. The position of the cable cup relative to the wall of the duct can be fixed by this directing unit prior to the cable cup being secured to the wall of the duct. According to the present invention, this directing unit incorporates rollers that support the cable cup on its underside, and cheek pieces that enclose the sides of the cable cup, so that when the carriage is moved the directing unit can be moved along the cable cup, it being ensured, however, that the cable cup is secured in the desired position.

In order to ensure that the directing unit can be moved in the direction of the wall of the duct, a piston-cylinder unit, preferably operated by a hydraulic medium, is disposed on the support, and the directing unit is mounted on this piston-cylinder unit.

Once the cable cup has been brought into the desired position by the directing unit, the cable cup must be secured by the mounting device; this must be done at a location in which the cable that is accommodated by the cable cup will not be damaged by the attachment means. In order that this location can be determined precisely and subsequently observed, according to another feature of the present invention a laser pointer that determines the attachment point of the cable cup on the wall of the duct, and a camera that records the attachment point are mounted on the support. The images generated by the camera are transmitted to a monitor that is located on the surface.

In order that the cable cup can now be secured to the wall of the duct, the mounting unit comprises a drilling device that is displaceable on the support, and an attachment device, preferably a screwdriver device, that is displaceable on the support. The position of the drilling device and the position of the attachment device on the carrier can be varied. This configuration makes it possible to first move the drilling device along the support to a location at which the required hole is to be drilled and then position the attachment device beneath the hole that has been drilled and subsequently install a fastener, preferably a securing screw, through the hole that has been drilled. As noted heretofore, this location is determined by the laser pointer; the operation can be observed by the camera as it is being completed.

Simple displacement of the drilling device and the attachment device on the support is effected most expediently in that these devices are disposed on a carriage that is displaceable on the support. The drilling device and the attachment device can, however, be disposed on different carriages that can move on the support independently of one another.

The drilling device comprises a drill that is mounted on a stand that can be moved toward the wall of the duct, preferably by the hydraulic piston-cylinder unit, so that the drill can be advanced as required.

The screwdriver unit that forms the attachment device has a receptacle that encloses the head of the screw and is driven in a rotary motion, and this has a flexible sleeve that encloses the head of the attachment screw. Such a configuration makes it possible to fix the head of the screw in the flexible sleeve of the screwdriver device before the attachment screw is screwed into the wall of the duct; once the attachment screw has been installed the screwdriver device is backed off in to the starting position and the screw head is decoupled as a result of the flexibility of the sleeve.

A screw magazine is supported in bearings on mounts on the slide on which the screwdriver device is installed so that the attachment screws are delivered automatically to the receptacle of the screwdriver device; each screw is delivered to the receptacle by way of a feed device.

The supporting device on which the cable cup is supported before its position on the wall of the duct has been determined and said cable cup is attached to the wall of the duct, has support rollers that can be moved toward the wall of the duct, preferably by a piston-cylinder unit that is operated by a pressurized medium, the carriage being supported on said rollers.

Once more in summary, in order to render it possible to secure a cable cup in an optimal location on the wall of an inaccessible duct, in which—above all—inlets into the duct are not obstructed, the present invention proposes a mounting device that comprises a carriage that is movable in the longitudinal direction of the duct, on which there is supporting unit for the cable cup that can be moved toward the wall of the duct. The carriage is pivotably connected to a support through a shaft that runs in the longitudinal direction of the duct. There is also provided a directing unit that supports the cable cup and is movable toward the wall of the duct, a drilling device that is movable in the longitudinal direction of the duct, and a screwdriver device that is movable in the longitudinal direction of the duct on said shaft. By pivoting the support and thus the directing unit, the cable cup that is supported on this directing unit is fixed in the desired position on the wall of the duct, whereupon a hole is drilled through the cable cup and into the wall of the duct by the drilling device and a screw is screwed into this hole by the screwdriver device.

Other features which are considered as characteristic for the invention are set forth in the appended claims.

Although the invention is illustrated and described herein as embodied in a mounting device for a cable cup, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
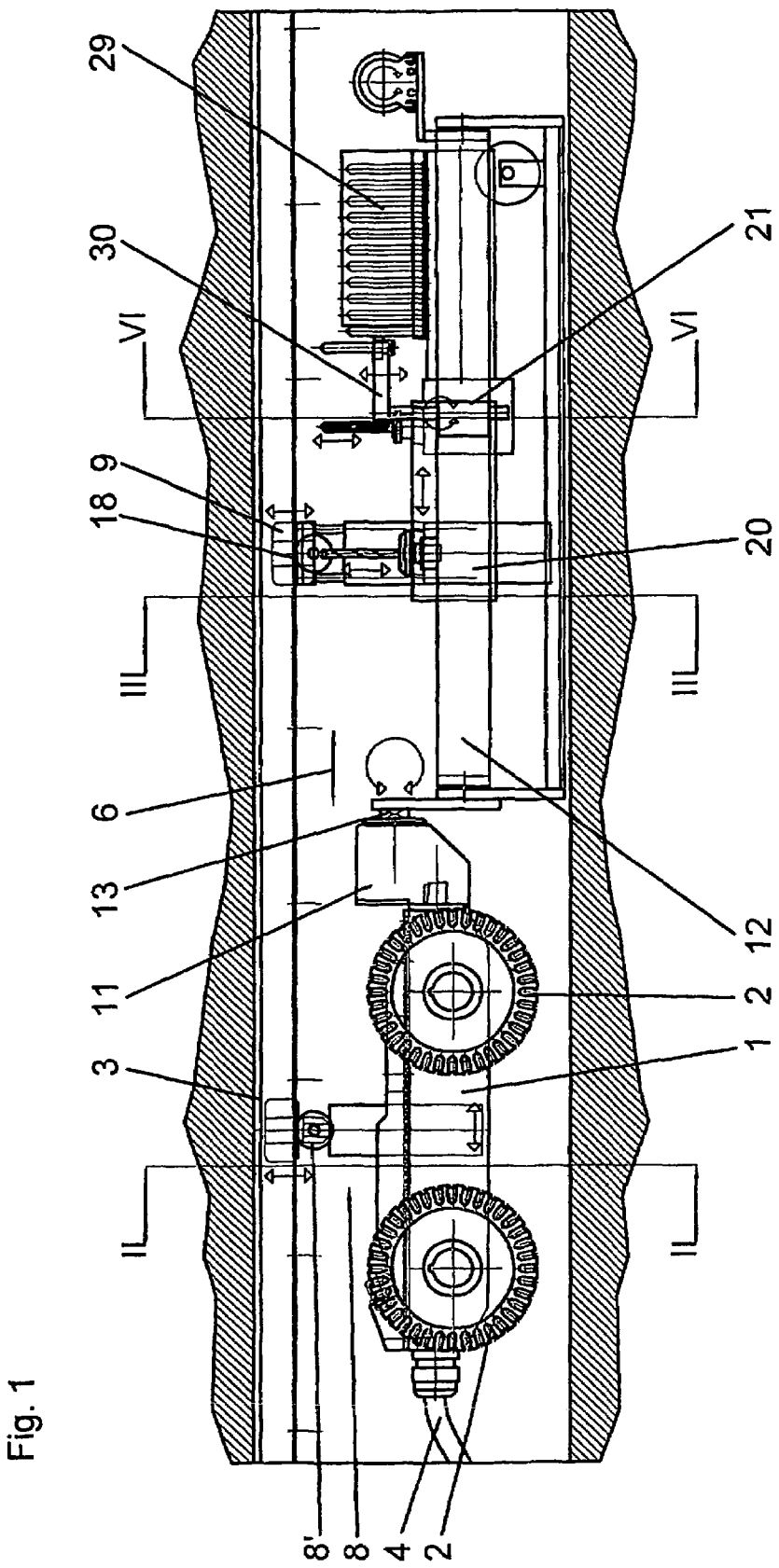
FIG. 1 is a longitudinal section through a duct with the mounting device according to the invention positioned in the duct.

Referring now to the figures of the drawing in detail and first, particularly, to FIG. 1 thereof, the mounting device according to the present invention comprises a carriage 1 that can be moved on wheels 2 within an inaccessible duct 3 by a non-illustrated drive motor. The carriage 1 is connected to the necessary power sources through a supply line 4 that leads to the surface.

Figure 2:
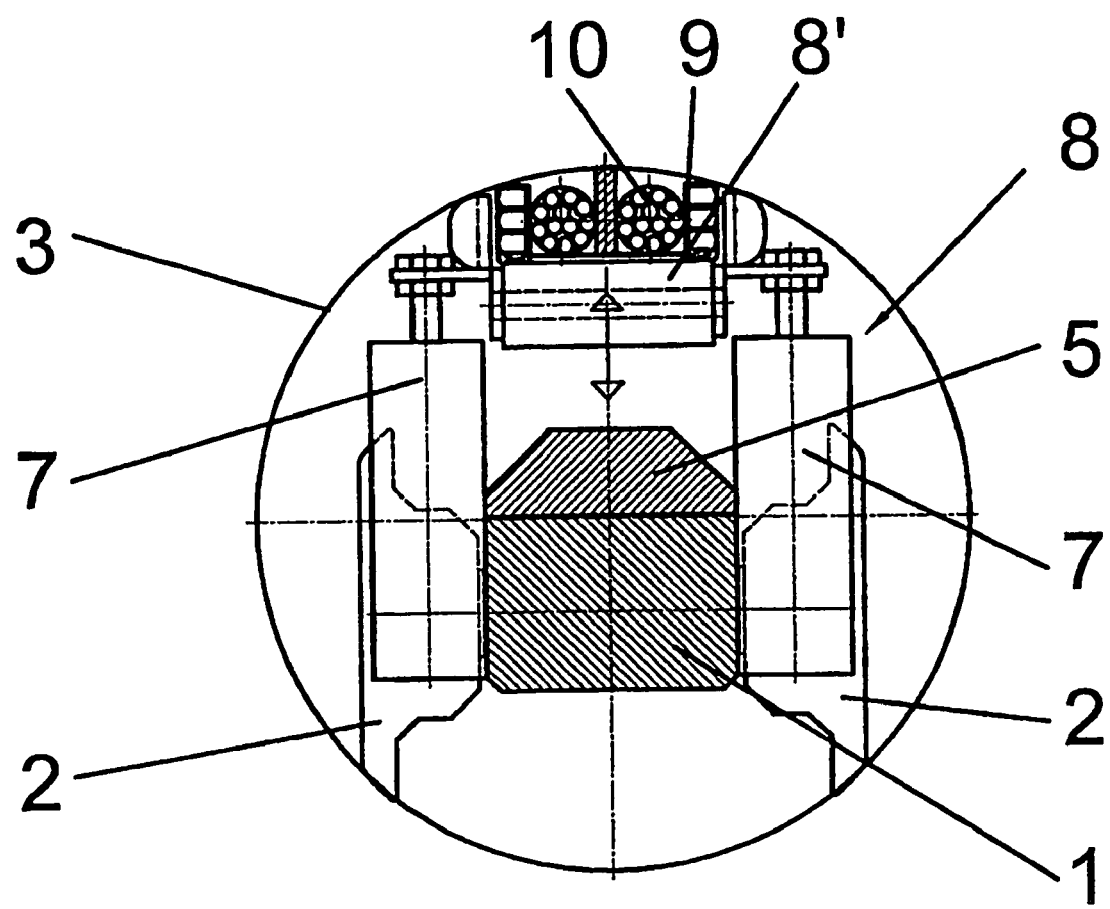
FIG. 2 is a cross section along the line II-II in FIG. 1.
Figure 3:
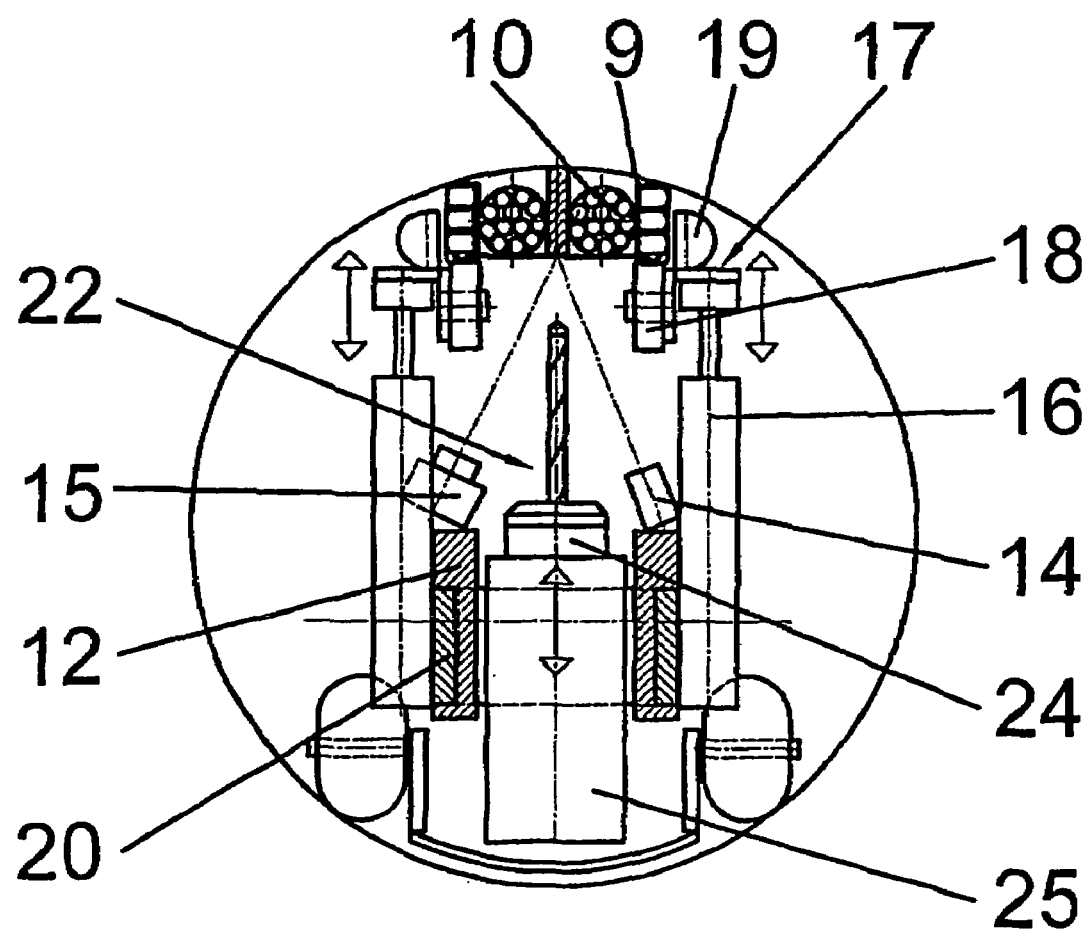
FIG. 3 is a cross section along the line III-III in FIG. 1.
Figure 4:
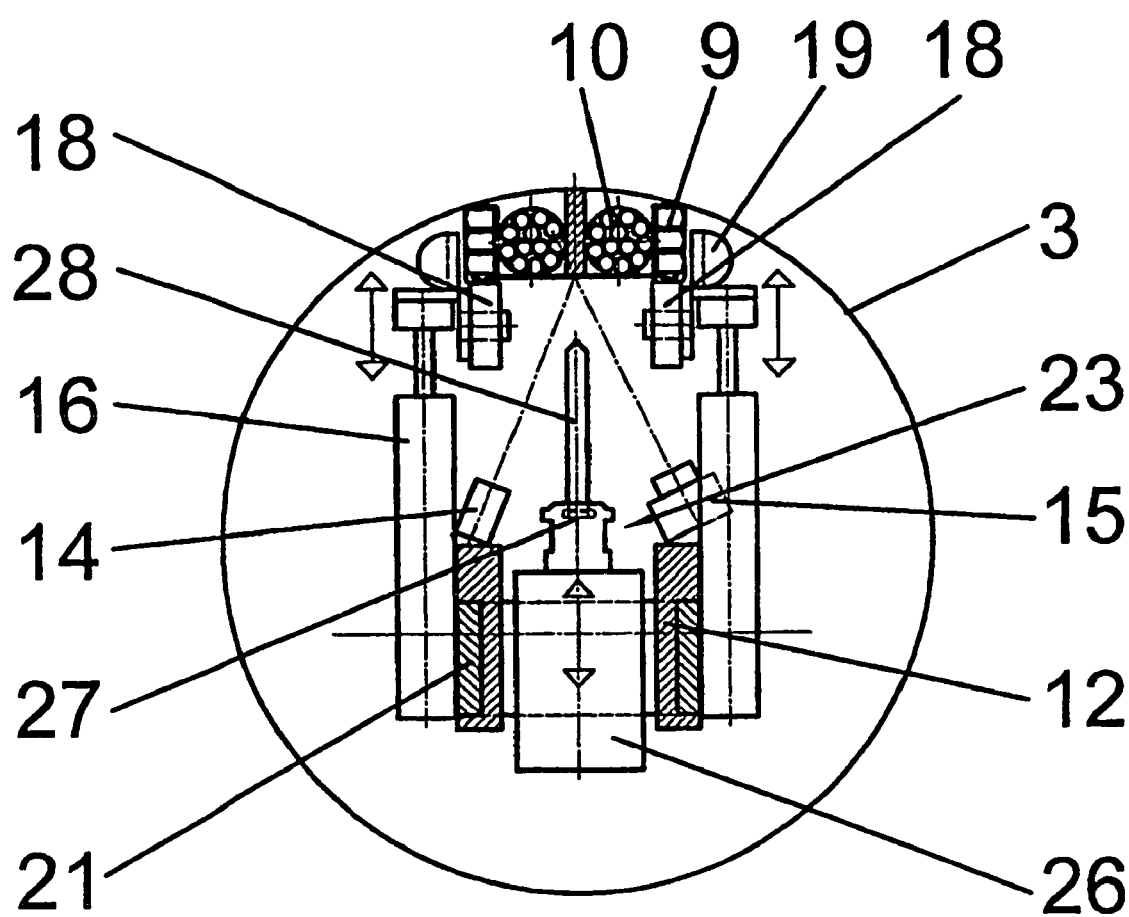
FIG. 4 is a cross section along the line IV-IV in FIG. 1.

A slide 5 that can be displaced in the longitudinal direction 6 of the duct is mounted on bearings on the carriage 1 (cf. FIG. 2). The slide 5 supports a pneumatic piston-cylinder unit 7 that is connected to support rollers 8' that form a supporting unit 8 that supports a cable cup 9 that accommodates the fiber-optic cables 10.

The end of the carriage 1 is connected to a console 11 on which a support 12 is mounted so as to pivot about a shaft 13 that runs in the longitudinal direction 6 of the duct. A laser pointer 14 and an observation camera 15, mounted on the support 12, can determine and observe the attachment point for the cable cup 9 on the wall of the duct.

A pneumatic piston-cylinder unit 16 is secured to the support 12 and a directing unit 17 for the cable cup 9 that can be moved in the direction of the duct wall is supported on this directing unit. This directing unit has rollers 18 that support the underside of the cable cup 9, and cheek pieces 19 that contain the cable cup at its sides. Depending on the way the support 12 is pivoted about the shaft 13, the directing unit fixes the cable cup 9 on the wall of the duct and holds it in this position, either at the crown of the duct or in a location other than this.

A slide 20 that can be displaced in the longitudinal direction 6 of the duct is supported on bearings on the support 12, and a drilling device 22 and a screwdriver device 23 are disposed on this carriage. A drilling device 22 and a screwdriver device 23 can also be disposed on separate slides that can be displaced independently of one another on the support 12. The drilling device 22 comprises a drill 24 that is mounted on a stand 25 that can be displaced toward the wall of the duct by a pneumatic piston-cylinder unit.

The screwdriver device 23 is similarly disposed on a stand 26 that can be displaced by a pneumatic piston-cylinder unit; it includes a receptacle 27 that incorporates a flexible sleeve that encloses the head of an attachment screw 28. Also mounted on the slide 20 is a screw magazine 29 from which each attachment screw 28 is delivered to the flexible sleeve of the receptacle 27.

The mounting device according to the present invention works as follows:

Once the carriage 1 has been introduced into the duct 3 through a manhole and an inspection shaft that leads to the surface and the supply lines 4 have been connected, the end of a cable cup 9 that is made up of a plurality of segments is laid on the support rollers 8' of the supporting unit 8. The supporting unit 8 is then moved in the direction of the wall of the duct by the pneumatic piston-cylinder unit 7. The cable cup 9 is next moved in the longitudinal direction 6 of the duct until the end rests on the directing unit 17. Then, if this is necessary, the support 12 is pivoted about the shaft 13, so that the directing unit 17 is displaced toward the wall of the duct, so that this directing unit 17 and the cable cup 9 that is resting upon it are in the desired position on the wall of the duct, in which the cable cup does not obstruct inlets into the duct. The location at which the cable cup is to be secured is marked by the laser pointer 14, without the lines 10 within the cable cup 9 being damaged in any way when this is done. As an example, this is the area where there is a spacer between the lines 10 within the cable cup 9.

Observation of the foregoing is possible by way of the camera 15.

Next, the slide 20 with the drilling device 22 and the screwdriver device 23 is moved to a location in which the drill 24 is located exactly beneath the location marked by the laser pointer 14, whereupon a hole is drilled through the spacer and into the wall of the duct by the drill 24. Once the drilling operation has been completed, the slide 20 is moved into a position in the screwdriver device 23 is beneath the hole that has been drilled, and the screwdriver device 23 and an attachment screw 28 that is in the receptacle 27 is screwed into the hole so that the cable cup 9 is secured to the wall of the duct at this location.

The screwdriver device 23 is next returned to its starting position, the rollers 8' of the supporting unit 8 and the directing unit 17 are lowered, and the carriage 1 with the support 12 that is mounted thereon so as to be able to pivot are moved along the duct in the longitudinal direction of said duct by a distance that is equal to the space between two attachment points for the cable cup, whereupon the procedure described heretofore is repeated.

We claim:

1. A mounting device for a cable cup for lines in a duct, comprising:
    a carriage movably disposed along a longitudinal direction of the duct;
    a supporting unit for the cable cup movably disposed on said carriage for movement toward a wall of the duct;
    a support pivotally connected to said carriage about a shaft extending in the longitudinal direction of the duct; and
    a mounting unit for securing the cable cup to the wall of the duct disposed on said support, wherein the mounting unit includes a directing unit that is movable in the direction toward the wall of the duct disposed on said support, said directing unit including rollers supporting at least a portion of the cable cup.

2. The mounting device according to claim 1, wherein said directing unit encloses the cable cup at least partially.

3. The mounting device according to claim 1, wherein said rollers support an underside of the cable cup and wherein said directing unit also has cheek pieces enclosing the cable cup at sides thereof.

4. The mounting device according to claim 1, which further comprises a piston-cylinder unit disposed on said support and carrying said directing unit.

5. The mounting device according to claim 4, wherein said piston-cylinder unit is a pressure medium-operated unit.

6. The mounting device according to claim 1, which further comprises a laser pointer mounted to said support for determining an attachment point for the cable cup on the wall of the duct.

7. The mounting device according to claim 1, which further comprises a camera, for recording an attachment point for the cable cup on the wall of the duct, mounted to said support.

8. The mounting device according to claim 1, wherein said mounting unit includes a drilling device, displaceably disposed on said support, and an attachment device, displaceably disposed on said support, whereby a position of said drilling device and a position of said attachment device are adjustable on said support.

9. The mounting device according to claim 8, wherein said attachment device is a screwdriver device.

10. The mounting device according to claim 9, wherein said screwdriver device includes a receptacle for enclosing a head of a securing screw, said receptacle is driveable in a rotary motion, and includes a flexible sleeve enclosing the head of the securing screw.

11. The mounting device according to claim 10, which comprises a screw magazine supported in bearings and a feed device, and wherein a head of each securing screw is fed to said receptacle by said feed device.

12. The mounting device according to claim 8, which comprises at least one slide supported on bearings on said support for displacement thereon, and said drilling device and said attachment device are disposed on said at least one slide.

13. The mounting device according to claim 8, wherein said drilling device includes a drill mounted on a stand that is movable toward the wall of the duct by a piston-cylinder unit that is operated by a pressurized medium.

14. The mounting device according to claim 1, wherein said supporting unit has support rollers movably disposed toward the wall of the duct and supported on said carriage.

15. The mounting device according to claim 14, which comprises a piston-cylinder unit operated by a pressurized medium for moving said support rollers of said supporting unit.

16. The mounting device according to claim 1 configured for laying fiber-optic cables in sewer ducts.

* * * * *